United States Patent [19]
Horie et al.

[11] Patent Number: 4,924,168
[45] Date of Patent: May 8, 1990

[54] CONTROL APPARATUS FOR PWM-CONTROLLED, VARIABLE VOLTAGE/VARIABLE FREQUENCY INVERTERS

[75] Inventors: Akira Horie; Yoshiji Jimbo, both of Katsuta, Japan

[73] Assignee: Hitachi, Ltd., Tokyo, Japan

[21] Appl. No.: 378,961

[22] Filed: Jul. 12, 1989

Related U.S. Application Data

[63] Continuation-in-part of Ser. No. 199,188, May 26, 1988, abandoned.

[30] Foreign Application Priority Data

Jun. 1, 1987 [JP] Japan ................... 62-134984

[51] Int. Cl.⁵ .............................................. H02M 1/12
[52] U.S. Cl. ..................................... 318/811; 363/41
[58] Field of Search ................. 363/41, 42; 318/811; 364/480, 492

[56] References Cited

U.S. PATENT DOCUMENTS

| | | | |
|---|---|---|---|
| 4,480,299 | 10/1984 | Muto et al. | 363/41 |
| 4,607,321 | 8/1986 | Obi | 363/41 |

FOREIGN PATENT DOCUMENTS

| | | | |
|---|---|---|---|
| 132772 | 8/1982 | Japan | 363/41 |
| 196872 | 12/1982 | Japan | 363/41 |
| 39294 | 3/1983 | Japan | 318/811 |
| 251477 | 11/1986 | Japan | |

*Primary Examiner*—William H. Beha, Jr.
*Attorney, Agent, or Firm*—Antonelli, Terry, Stout & Kraus

[57] ABSTRACT

In a PWM-controlled, variable voltage/variable frequency inverter, a pulse mode, which is identified by a number of voltage pulses within one cycle of an output AC voltage of the inverter, is changed in accordance with a frequency of the output AC voltage and an output AC voltage factor, which is a ratio of an output AC voltage to be produced by the inverter at that time to a maximum value of the output AC voltage which can be produced under a then-present value of a voltage of a DC voltage source for the inverter.

3 Claims, 8 Drawing Sheets

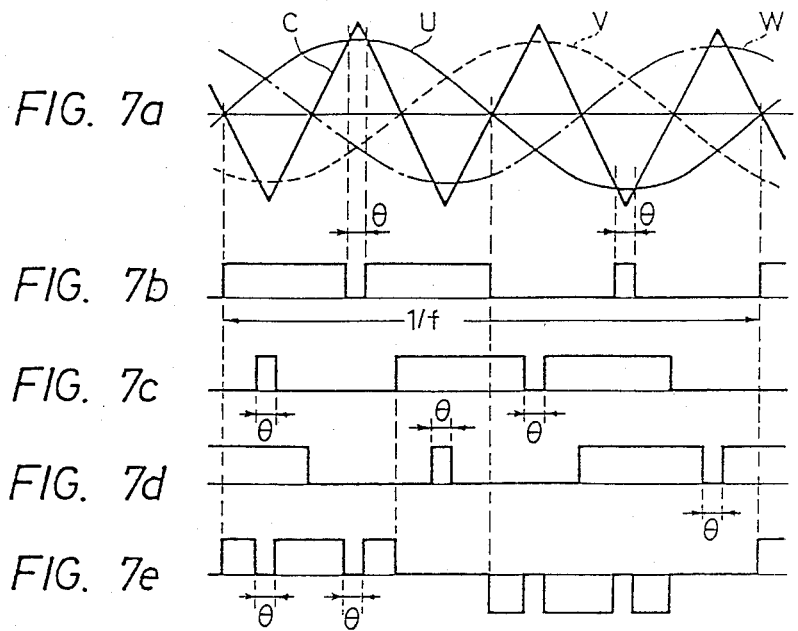
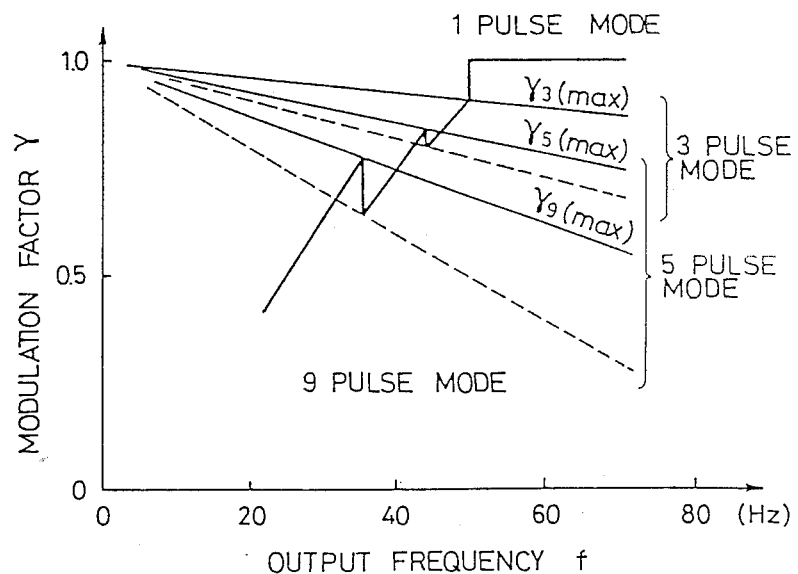

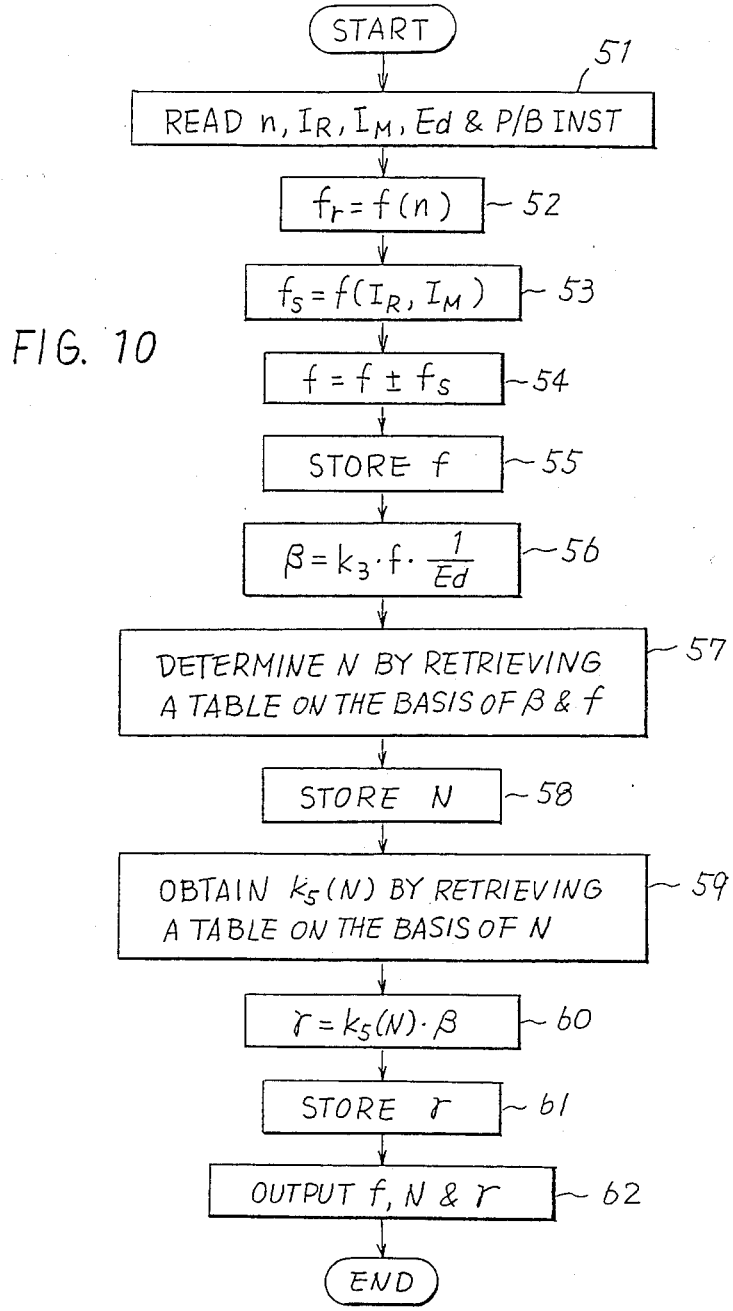

CONTROL APPARATUS FOR PWM-CONTROLLED, VARIABLE VOLTAGE/VARIABLE FREQUENCY INVERTERS

CROSS-REFERENCE TO RELATED APPLICATION

This is a continuation-in-part of application Ser. No. 199,188, filed May 26, 1988 now abandoned.

BACKGROUND OF THE INVENTION

1. Field of the Invention

The present invention relates to an improvement of a control apparatus for a variable voltage/variable frequency inverter controlled on the pulse width modulation basis, and particularly to an improved control apparatus for an inverter for feeding an induction motor, which is controlled to produce constant torque.

2. Background of the Related Art

It is known to control an induction motor by means of an inverter of a variable voltage/variable frequency (VVVF) type, which is operated on a pulse width modulation (PWM) basis, so as to produce constant output torque. For the PWM control of an inverter as mentioned above, there is often adopted a so-called sinusoidal wave modulation method. In such a modulation method, control signals for semiconductor switching elements, such as transistors or gate turn-off thyristors, of an inverter are produced by comparing a sinusoidal wave modulation signal and a triangular wave carrier signal, both of which are synchronized with each other.

An output AC voltage of such an inverter is controlled by varying a modulation factor, which is a ratio of the amplitude of a modulation signal to that of a carrier signal, and its frequency is controlled by varying the frequency of the modulation signal. Further, in the following, the frequency of an output AC voltage of an inverter will be simply called an output frequency. It is to be noted here that a maximum value of a modulation factor is limited by a minimum allowable turn-off time of semiconductor switching elements used in an inverter, although it will be described in detail later.

On the other hand, for the purpose of performing the constant torque control of an induction motor, an inverter must be controlled in such a manner that a ratio of an output AC voltage V thereof to its output frequency f is maintained at a required constant value; namely, the inverter is controlled in accordance with a predetermined V/f ratio characteristic. Moreover, it is usually carried out to change a number of voltage pulses within one cycle of the output AC voltage of a PWM-controlled inverter in accordance with a predetermined range of the output frequency, in order to reduce the amplitude of a ripple component included in an output current due to the PWM control. The change of the number of voltage pulses can be achieved by varying a ratio of the frequency of a carrier signal to that of a modulation signal.

In such a PWM-controlled inverter, the output AC voltage thereof is controlled by varying a modulation factor, while maintaining a number of voltage pulses at a desired value over a predetermined range of the output frequency. The operation of an inverter under a certain number of voltage pulses is identified by the number of voltage pulses, which is called "mode". For example, the operational mode of an inverter is changed form "9 pulse mode" through "5 pulse mode" and "3 pulse mode" and, finally, to "single pulse mode" with the increase of the output frequency.

Conventionally, the change of a pulse mode is carried out in accordance with reference frequencies fixedly provided in advance. Namely, when an output frequency becomes equal to the corresponding reference frequencies, a pulse mode is changed between a 9 pulse mode and a 5 pulse mode, between a 5 pulse mode and a 3 pulse mode, or between a 3 pulse mode and a single pulse mode, respectively. It is recognized that the reference frequencies as mentioned above are so selected that the amplitude of the ripple component of an output current is made as small as possible. In such a conventional control apparatus, however, there was a drawback as follows.

When a pulse mode is changed, there occurs a peak value in an output current of an inverter. If the voltage of a DC voltage source for an inverter is high, the aforesaid peak value in the output current becomes large accordingly, which may exceed the limit of a commutateable current of semiconductor switching elements of the inverter. On the contrary, if the DC source voltage is low, a non-conductive period of the switching elements is made very small, which may be smaller than a minimum allowable turn-off time. This causes the commutation failure in the inverter. For the purpose of eliminating the above mentioned drawback, there has been proposed a control apparatus as disclosed in the Japanese Patent Laid-open No. JP-A-57/129170 (published Aug. 11, 1982).

According to the prior art, in a PWM-controlled VVVF inverter, a present modulation factor is ascertained in every pulse mode by the calculation on the basis of the voltage of a DC voltage source for the inverter and an output frequency of the inverter, and the change of a pulse mode is carried out, when it is discriminated that the ascertained modulation factor reaches a maximum value thereof as determined on the basis of a present pulse mode and an output frequency at that time. In this manner, the prior art control apparatus can cope with the variation of the voltage of a DC voltage source for an inverter.

Actually, however, there are often cases, where a PWM-controlled VVVF inverter must be controlled in accordance with a different V/f ratio characteristic. In such cases, the prior art requires a new pulse mode change characteristic, which is suitable for a new V/f ratio characteristic. Therefore, the prior art control apparatus lacks the flexibility and was not suited for the wide use in various V/f ratio characteristics.

SUMMARY OF THE INVENTION

An object of the present invention is to provide a control apparatus for a PWM-controlled VVVF inverter, which is capable of automatically changing a pulse mode, even if a different V/f ratio characteristic is required.

A feature of the present invention resides in that a pulse mode in the operation of a PWM-controlled inverter is changed in accordance with an output frequency of the inverter and a signal depending on an output AC voltage factor, which is defined as a ratio of an output AC voltage to be produced by the inverter at that time to a maximum output AC voltage which can be derived under a then-present voltage of a DC voltage source for the inverter.

In the present invention, there is not needed any pulse mode change characteristic, which conventionally had to be provided in advance so as to fit a particular V/f ratio characteristic required. According to the present invention, by incorporating a signal representative of an butput AC voltage factor into the mode change control, a pulse mode can be automatically changed to a succeeding pulse mode at a proper output frequency.

BRIEF DESCRIPTION OF THE DRAWINGS

FIGS. 7a to 7e are explanatory drawings, in which there are shown waveforms of various signals and amounts in the PWM control;

FIG. 8 is an explanatory drawing, in which there are shown the relation of the modulation factor with respect to the output frequency and the manner of actually controlling the modulation factor in accordance with the present invention;

FIG. 10 shows a flow chart of the processing operation to be executed by a microcomputer in the another embodiment of FIG. 9.

DESCRIPTION OF THE PREFERRED EMBODIMENTS

Before the description of an embodiment of the present invention, a problem of the prior art will be described further in detail, referring to FIGS. 1 and 2.

Here is discussed an example, in which a pulse mode is changed from a 9 pulse mode to a single pulse mode through a 5 pulse mode and then a 3 pulse mode with the increase of an output frequency. In FIG. 1, there are shown maximum modulation factors $\gamma_9(max)$, $\gamma_5(max)$ and $\gamma_3(max)$ in the 9, 5 and 3 pulse modes. In the region below the line $\gamma_9(max)$, an inverter is operated in the 9 pulse mode. In the region between the lines $\gamma_9(max)$ and $\gamma_5(max)$, the inverter is operated in the 5 pulse mode, and similarly, in the region between the lines $\gamma_5(max)$ and $\gamma_3(max)$, it is operated in the 3 pulse mode. Finally, in the region beyond the line $\gamma_3(max)$, it is operated in the single pulse mode.

Further, assuming that a V/f ratio characteristic required under a certain voltage of a DC voltage source for an inverter is as shown by a solid line A, the inverter is controlled to increase the output AC voltage $V_a$ thereof along the line A with the increase of the output frequency f. In the course of this control, the pulse mode is changed at frequencies, at which the line A crosses with the respective lines $\gamma_9(max)$, $\gamma_5(max)$ and $\gamma_3(max)$.

Figure 2:
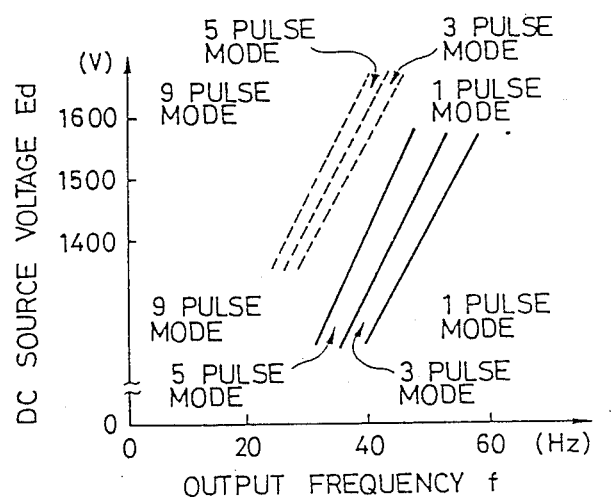
FIG. 2 is also an explanatory drawing of the problem of the prior art control apparatus, in which there are shown examples of a pulse mode change characteristic.

If the thus determined frequencies for the pulse mode change are plotted with respect to the variation of the DC source voltage $E_d$, there are obtained mode change characteristics as shown by a group of solid lines in FIG. 2. In the figure, if the DC source voltage $E_d$ is 1500 volts, for example, the mode change is carried out at the output frequencies, at which a horizontal line indicating the voltage of 1500 volts crosses with the respective solid lines.

Figure 1:
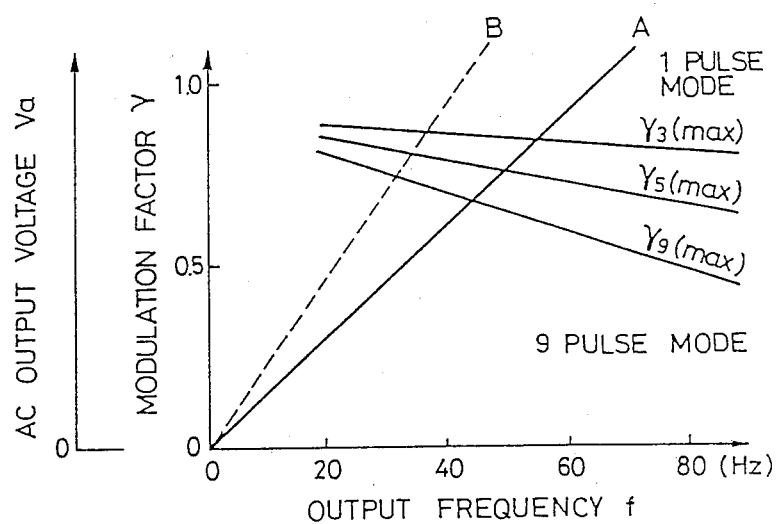
FIG. 1 is an explanatory drawing of a problem of a prior art control apparatus, in which there are shown the relations of an output AC voltage $V_a$ and a modulation factor $\gamma$ with respect to an output frequency f.

As described above, in the prior art control apparatus, there had to be provided the mode change characteristics, as shown in FIG. 2, which are obtained in advance on the basis of the relations, as shown in FIG. 1, of the modulation factor $\gamma$ and the output AC voltage $V_a$ with respect to the output frequency f. If, therefore, it is required to change the V/f ratio characteristic as shown by a broken line B in FIG. 1, also the mode change characteristics must be changed, as shown by a group of broken lines in FIG. 2. Such inconvenience is resulted from the fact that the mode change is carried out on the basis of the DC source voltage $E_d$, not the output AC voltage Va, and the output frequency f.

Then, according to the present invention, there is introduced a concept of an output AC voltage factor $\beta$ into the mode change control. The output AC voltage factor $\beta$ means a ratio of an output AC voltage, which is required to be produced by an inverter under a then present DC source voltage, to a maximum output AC voltage, which can be derived from the inverter under the then present DC source voltage.

Figure 3:
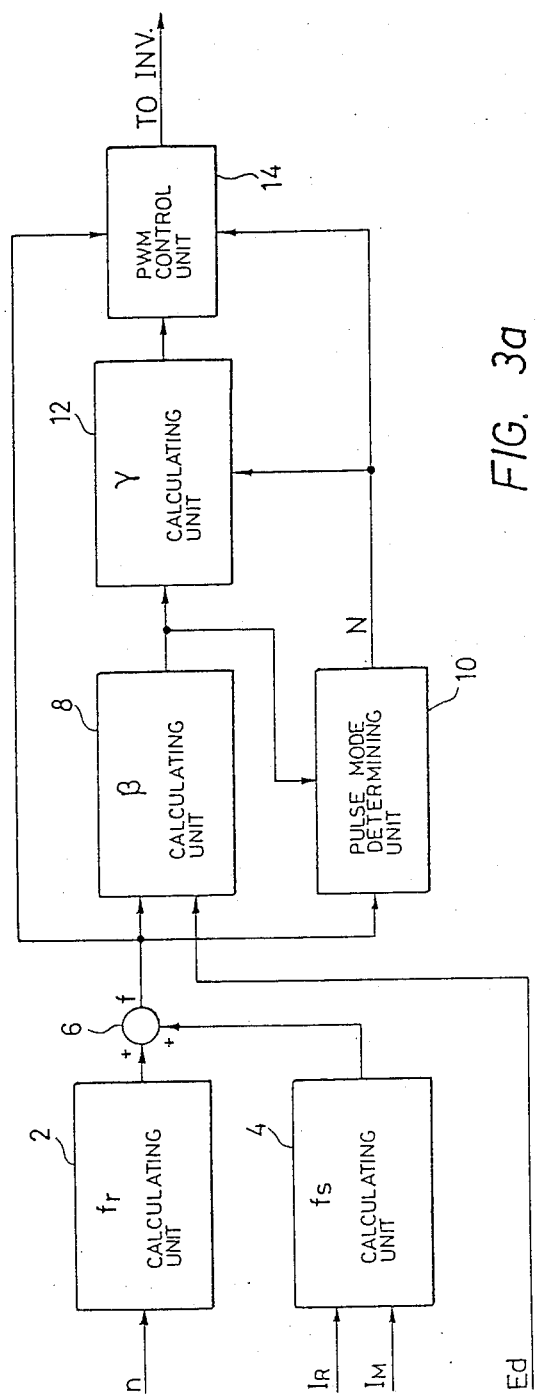
FIG. 3 is a block diagram schematically showing a control apparatus for a PWM-controlled VVVF inverter according to an embodiment of the present invention.
Figure 3A:
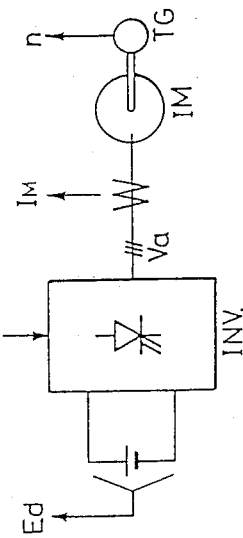
FIG. 3a schematically shows a configuration of an inverter-driven induction motor system, to which the present invention is applied.

Referring now to FIG. 3, the explanation will be made of the overall configuration of a control apparatus for an inverter according to an embodiment of the present invention. Further, FIG. 3a shows an inverter-driven induction motor system, to which the present invention is applied.

First of all, there will be described the arrangement of the inverter-driven induction motor system. In FIG. 3a, a DC source voltage $E_d$ is supplied to a VVVF inverter INV, which is controlled by gate signals on the PWM basis and inverts the DC source voltage $E_d$ into an output AC voltage $V_a$. The DC source voltage $E_d$ is detected by an appropriate voltage detector, an output signal of which is coupled to a control apparatus as a DC source voltage signal $E_d$. The output AC voltage $V_a$ of the inverter is supplied for an induction motor IM, which is to be controlled to produce constant torque. A current flowing through the induction motor IM is detected by an appropriate current detector, an output signal of which is also coupled to the control apparatus as a motor current signal $I_M$, which corresponds to an output current of the inverter INV. A tachometer generator TG is coupled to the induction motor IM and produces a signal n in proportion to the rotational speed of the induction motor IM.

Referring now to FIG. 3, reference numeral 2 denotes a $f_r$ calculating unit, in which a rotational frequency $f_r$ is calculated on the basis of the rotational speed signal n. Reference numeral 4 denotes a $f_s$ calculating unit, in which a slip frequency $f_s$ of the induction motor IM is calculated on the basis of a motor current reference $I_R$ and the actual motor current $I_M$. The thus obtained rotational frequency $f_r$ and slip frequency $f_s$ are added in an adder 6, whereby a frequency f of an output AC voltage $V_a$ applied to the induction motor IM, which corresponds to the aforesaid output frequency, is obtained.

Further, since the description herein is based mainly on the powering of the induction motor IM, $f_r$ and $f_s$ are added in the adder 6, as described above. As is well known, the frequency f is to be obtained by subtracting $f_s$ from $f_r$ in the case of the braking operation of the motor IM.

Reference numeral 8 denotes a $\beta$ calculating unit, which receives both the output frequency signal f and the detected DC voltage signal $E_d$ and produces the output AC voltage factor $\beta$. The characteristic and arrangement of the $\beta$ calculating unit 8 will be described in detail later, referring to FIGS. 4 and 4a. Reference numeral 10 denotes a pulse mode determining unit, in which the pulse mode is determined on the basis of the output AC voltage factor $\beta$ and the output frequency signal f, and a signal N representing the determined pulse mode is produced. Also the detailed characteristic and arrangement thereof will be explained later, referring to FIGS. 5 and 5a.

Reference numeral 12 denotes a $\gamma$ calculating unit, in which the modulation factor $\gamma$ is determined on the basis of both the output AC voltage factor $\beta$ and the pulse mode signal. The characteristic and arrangement of the $\gamma$ calculating unit 12 will be described in detail later, referring to FIGS. 6 and 6a. The calculated modulation factor $\gamma$ is given to a PWM control unit 14, together with the output frequency signal f and the pulse mode signal N. The PWM control unit 14 produces gate signals for the inverter INV.

Various kinds of PWM control devices have been proposed so far. For example, a modulation circuit disclosed in UP Patent No. 4,723,201 issued to Tanamachi et al on Feb. 2, 1988 and assigned to the same assignee can be used as the PWM control unit 14. Here will be explained the general operation of the PWM control unit 14 briefly, referring to FIGS. 7a to 7e.

The PWM control unit 14 produces, at first, sinusoidal modulation signals corresponding to the respective phases of the AC output voltage of the inverter, as shown by U, V and W in FIG. 7a. The frequency and the amplitude of such modulation signals are determined by the output frequency signal f and the modulation factor $\gamma$, respectively. Further, a triangular carrier signal as shown by C in FIG. 7a is produced in the PWM control unit 14, the frequency of which is determined by the output frequency signal f and the pulse mode signal N. The amplitude of the carrier signal is usually fixed.

Then, the modulation signals U, V and W are compared with the carrier signal C, and the gate signals as shown in FIGS. 7b to 7d are produced in accordance with the comparison result. As the result that the inverter INV is operated by the thus produced gate signals, a line voltage between phases U and V, for example, becomes as shown in FIG. 7e, which can be obtained by the exclusive-OR of a gate signal waveform for the phase U of FIG. 7b and that for the phase V of FIG. 7c.

It will be seen from those figures that there exist three pulses within one cycle of the corresponding modulation signals, or three line voltage pulses within half cycle of the output AC voltage. Therefore, an example as shown here is called the 3 pulse mode.

Referring next to FIGS. 4 to 6 and 4a to 6a, there will be given the explanation of the operation of the control apparatus shown in FIG. 3.

As already described, the output AC voltage factor $\beta$ is represented as a ratio of an output AC voltage $V_a$, which is required to be produced by an inverter under a then present DC source voltage $E_d$, to a maximum output AC voltage, which can be derived from the inverter under the then present DC source voltage $E_d$. Since the maximum output AC voltage is in proportion to the then present DC source voltage $E_d$, the output AC voltage factor $\beta$ is represented by the following formula;

$$\beta = \frac{V_a}{k_1 \cdot E_d} \tag{1}$$

wherein $k_1$ is a constant.

Further, since the output AC voltage $V_a$ is controlled so as to maintain its ratio $k_2$ to the output frequency f constant, the above formula (1) is rewritten as follows;

$$\beta = \frac{k_2 \cdot f}{k_1 \cdot E_d} = k_3 \cdot f \cdot \frac{1}{E_d} \tag{2}$$

wherein $k_3$ ($=k_2/k_1$) is a constant.

Figure 4:
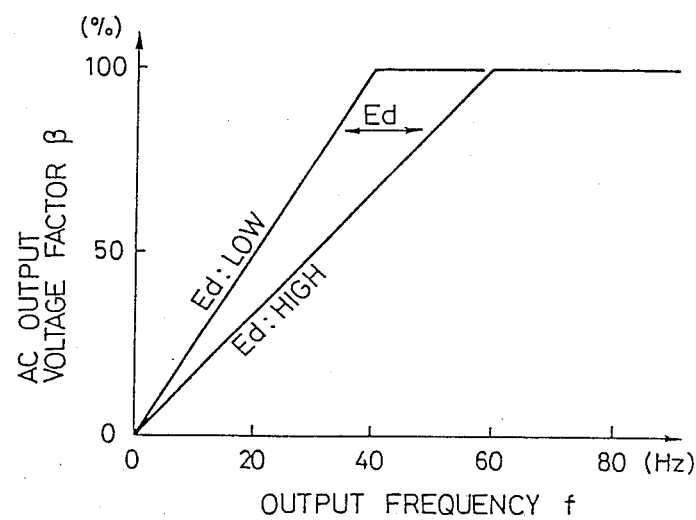
FIG. 4 shows a characteristic of an output AC voltage factor calculating unit used in the control apparatus of FIG. 3.

In FIG. 4, there is shown the relation represented by the above formula (2), taking the DC source voltage $E_d$ as a parameter. As will be understood from the relation shown, by selecting a large $\beta$ in the case of a low $E_d$, or by selecting a small $\beta$ in the case of a high $E_d$, a $V_a/f$ ratio can be maintained always constant, even though $E_d$ is varied.

Figure 4A:
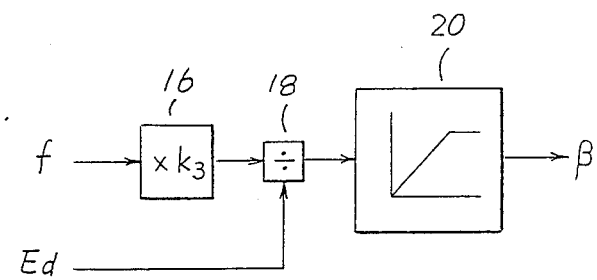
FIG. 4a is a block diagram schematically showing the output AC voltage factor calculating unit, by which the characteristic of FIG. 4 is provided.

To implement the algorithm as represented by the formula (2) above, the $\beta$ calculating unit 8 can be constructed by constant multiplier 16, divider 18 and limiter 20, as shown in FIG. 4a. These individual components are well known. The frequency f obtained by the adder 6 is multiplied by the constant $k_3$ in the constant multiplier 16. The thus obtained $k_3 \cdot f$ is divided by the DC source voltage $E_d$ in the divider 18, whereby the output AC voltage factor $\beta$ is obtained. Further, the output of the divider 18 is subject to limit by the limiter 20, when it exceeds a predetermined value. With the $\beta$ calculating unit 8 as constructed above, the characteristic as shown in FIG. 4 can be achieved. The factor $\beta$ outputted from the limiter 20 is given to the pulse mode determining unit 10 and the $\gamma$ calculating unit 12.

By the way, as already described, there exists a minimum turn-off time in the semiconductor switching elements of the inverter, which corresponds to a minimum value of $\theta$ in FIGS. 7a to 7e. If the non-conductive period of the switching elements becomes smaller than the minimum allowable turn-off time $\theta(min)$, the switching elements fail. Therefore, the maximum value $\gamma(max)$ of the modulation factor in the respective output frequency f must be limited by such a minimum turn-off time $\theta$(min), which is represented by the following formula:

$$\gamma(max) = 1 - k_4(N) \cdot \theta(min) \cdot f \qquad (3)$$

wherein $k_4(N)$ is a constant determined in accordance with the pulse mode.

Further, there is the following relation between the modulation factor $\gamma$ and the output AC voltage factor $\beta$;

$$\gamma = k_5(N) \cdot \beta \qquad (4)$$

wherein $k_5(N)$ is a constant determined in accordance with the pulse mode.

Figure 5:
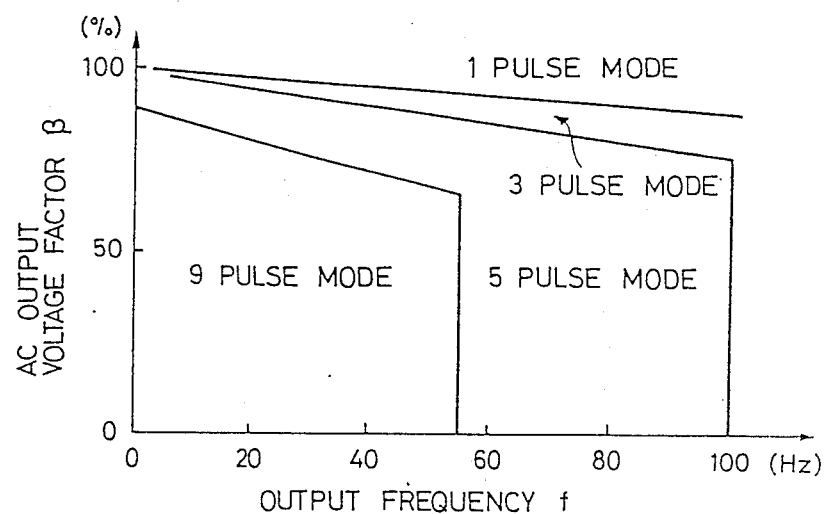
FIG. 5 shows a characteristic of a pulse mode determining unit used in the control apparatus of FIG. 3.
Figure 5A:
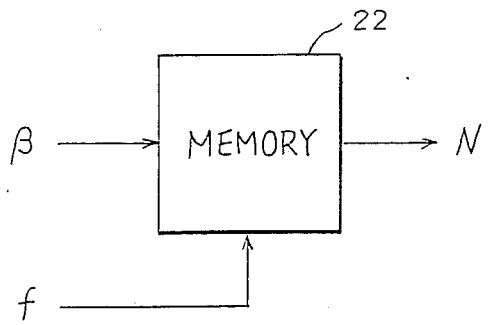
FIG. 5a is a block diagram schematically showing the pulse mode determining unit, by which the characteristic of FIG. 5 is provided.

Then, if the relation of the output AC voltage factor $\beta$ and the output frequency f is plotted for every pulse mode in accordance with the formulas (b 3) and (b 4), there is obtained a characteristic as shown in FIG. 5. This characteristics is provided in the pulse mode determining unit 10. Therefore, the determining unit 10 is capable of determining the pulse mode in accordance with the characteristic of FIG. 5 on the basis of the output AC voltage factor $\beta$ and the output frequency f taken thereinto. If, for example, the output AC voltage factor $\beta$ obtained by the calculating unit 8 is 60% and the output frequency f obtained by the adder 6 is 50 Hz, the inverter should be operated in the 9 pulse mode.

Further, it is to be noted that, as shown is FIG. 5, the region of the respective pulse mode is limited with respect to the output frequency f; for example, the region of the 9 pulse mode is under about 55 Hz of the output frequency and that of the 5 pulse mode is under 100 Hz. Although the region of the 3 pulse mode is also limited under about 170 Hz, that is not shown in the figure. The frequency for the limitation as mentioned above is so determined that a product of a number of pulses in the respective pulse mode and the output frequency f is always maintained constant. The aforesaid product means a switching frequency of the switching elements of the inverter. Therefore, the fact that the product of the number of pulses and the output frequency is maintained constant is to provide the upper limit of the switching frequency of the semiconductor switching elements of the inverter, whereby there can be suppressed the increase of the switching power loss occurring in the inverter, which will increase otherwise.

The pulse mode determining unit 10 as mentioned above is realized by memory 22, as shown in FIG. 5a. A read-only memory, which is programed in accordance with the characteristics as shown in FIG. 5, can be employed as the memory 22, for example. Therefore, the pulse mode N can be read out by retrieving the memory 22 by using $\beta$ and f as address signals.

Figure 6:
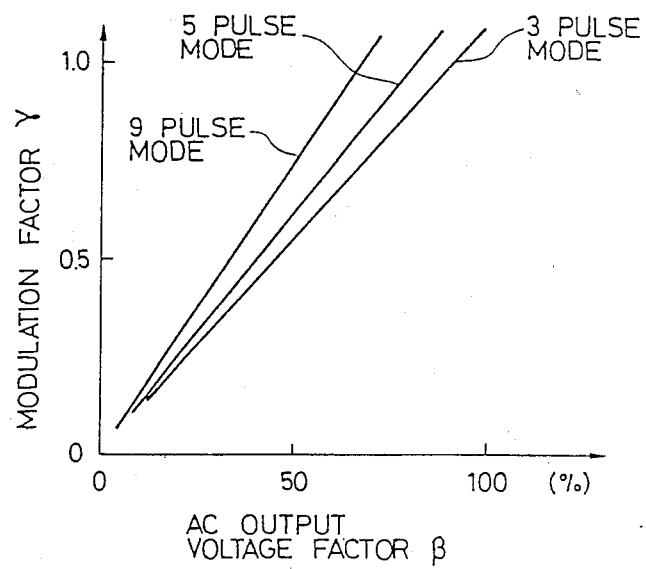
FIG. 6 shows a characteristic of a modulation factor calculating unit used in the control apparatus of FIG. 3.

The relation represented by the formula (b 4) is as shown in FIG. 6. There is provided the aforesaid relation in the $\gamma$ calculating unit 12, to which there are supplied the output AC voltage factor $\beta$ produced by the calculating unit 8 and the pulse mode signal N produced by the determining unit 10. In the calculating unit 12, therefore, the modulation factor $\gamma$ can be determined in accordance with the relation of FIG. 6 on the basis of the output AC voltage factor $\beta$ and the pulse mode signal N.

Figure 6A:
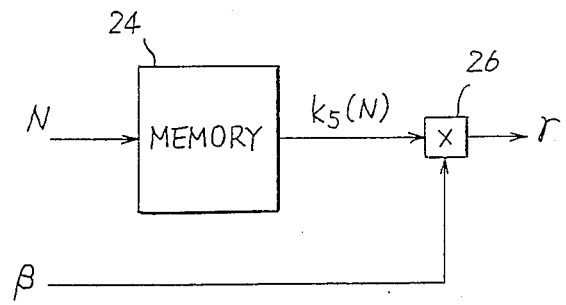
FIG. 6a is a block diagram schematically showing the modulation factor calculating unit, by which the characteristic of FIG. 6 is provided.

The aforesaid $\gamma$ calculating unit 12 can be constructed by memory 24 and multiplier 26, as shown in FIG. 6a. The memory 24 stores data concerning the constant $k_5(N)$ of the formula (b 4). Also in this case, a read-only memory, which is programmed in advance, will be utilized for the memory 24. Values of the constant $k_5(N)$ can be read out by retrieving the memory 24 by using N as an address signal. Then, the thus obtained constant $k_5(N)$ is multiplied by $\beta$ in the multiplier 26, whereby the modulation factor $\gamma$ is determined.

The modulation factor $\gamma$, the pulse mode signal N and the output frequency f obtained in a manner as described above are supplied for the PWM control unit 14, in which the gate signals are produced on the basis thereof, as already described.

There is shown in FIG. 8 the change of the modulation factor $\gamma$ with respect to the output frequency f, when the pulse mode control according to the present invention is carried out. As seen from the figure, there are some discontinuous points in the change of the modulation factor $\gamma$. This is because there is in every pulse mode a maximum limit value $\gamma$(max) of the modulation factor $\gamma$, which is given by the formula (b 3) and the output AC voltage factor $\beta$ differs in accordance with the pulse mode, even though the modulation factor $\gamma$ is identical. Therefore, as shown in FIG. 8, the modulation factor $\gamma$ becomes necessary to be controlled in the discontinuous manner in order to keep the continuity of the change of the output AC voltage factor $\beta$.

Further, a minimum value of the modulation factor $\gamma$ in every pulse mode, which is shown by a broken line in FIG. 8, is determined as follows. A minimum value of the modulation factor $\gamma$ in the 5 pulse mode, for example, is determined so as to make the output AC voltage factor $\beta$ under the minimum modulation factor of the 5 pulse mode equal to that under the maximum modulation factor $\gamma_9$(max) of the 9 pulse mode. In an analogous manner, minimum modulation factors in other pulse modes can be also determined.

In the prior art control apparatus, the reference frequencies for changing the pulse mode have been fixedly provided without consideration of the alteration of the V/f ratio characteristic, although they are adjustable against the variation of the DC source voltage. In the present invention, the alteration of the V/f ratio characteristic is managed by using the output AC voltage factor $\beta$, which is determined with the variation of the DC source voltage taken into consideration. Accordingly, reference frequencies, at which the pulse mode in the operation of the PWM-controlled inverter is changed, can be properly changed, taking account of not only the variation of the DC source voltage, but also the alteration of the V/f ratio characteristic .

In the foregoing, although the embodiment of the present invention has been described in the form of an apparatus constructed by discrete devices for carrying out the respective functions, the present invention can be also implemented by using a microcomputer, which is programmed in accordance with the same architecture as underlying the foregoing embodiment. In the following, explanation will be made of another embodiment of the present invention, in which a microcomputer is employed, referring to FIGS. 9 and 10.

Figure 9:
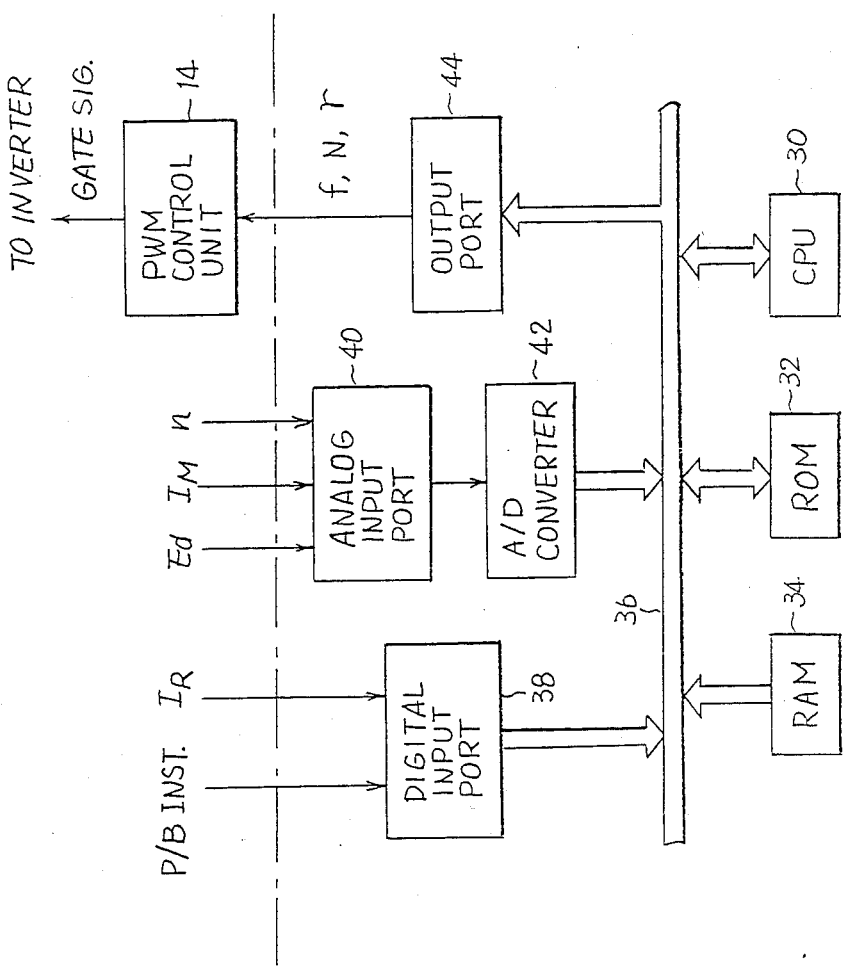
FIG. 9 is a block diagram schematically showing a control apparatus for a PWM-controlled VVVF inverter according to another embodiment of the present invention.

FIG. 9, at first, shows the configuration of the another embodiment. As usual, a microcomputer used in this embodiment comprises central processing unit (CPU) 30, read-only memory (ROM) 32 and random access memory (RAM) 34, which are coupled with each other through bus 36. The CPU 30 executes a program for a predetermined processing operation as described later, the ROM 32 stores such a program and various constants necessary for execution of the processing operation, and the RAM 34 temporarily stores intermediate results on the way of the processing operation and final results thereof.

The microcomputer is further provided with various input/output peripheral resources, as follows. Digital input port 38 is coupled to the bus 36, through which digital input signals, such as a motor current reference $I_R$ and a powering/braking (P/B) instruction, are inputted to the microcomputer. Further, analog/digital (A/D) converter 42 is coupled to the bus 36, which converts analog input signals, such as a DC source voltage $E_d$, an actual motor current $I_M$ and a rotational speed n taken through analog input port 40, into the digital form, and supplies the converted digital signals to the microcomputer through the bus 36. All the digital signals as described above are temporarily stored in the RAM 34 for use in the processing by the CPU 30.

The CPU 30 reads out necessary data stored in the RAM 34 and executes the processing of the read-out data in accordance with the program stored in the ROM 32, whereby the frequency f, the pulse mode N and the modulation factor $\gamma$ necessary for producing gate signals of the inverter on the PWM control basis are obtained, which are supplied to the PWM control unit 14 through output port 44 coupled to the bus 36.

Referring next to FIG. 10, the processing operation executed by the microcomputer will be explained.

When the processing operation starts, the rotational speed n, the motor current reference $I_R$, the actual motor current $I_M$, the DC source voltage $E_d$ and the P/B instruction are read at step 51. Next, at step 52, the rotational frequency $f_r$ is obtained on the basis of the rotational speed n.

At step 53, the slip frequency $f_s$ is obtained on the basis of a difference between the motor current reference $I_R$ and the actual motor current $I_M$. Then, at step 54, the frequency f is calculated on the basis of $f_r$ obtained at step 52 and $f_s$ obtained at step 53. When the induction motor $I_M$ is in the powering operation, the addition of $f_r$ and $f_s$ is carried out at step 54, and when it is in the braking operation, the subtraction thereof is performed. Namely, the sign of $f_s$ in the formula of step 54 depends on the P/B instruction read at step 51. The thus obtained f is once stored in a predetermined area of the RAM 34 at step 55.

Next, at step 56, the calculation of the output AC voltage factor $\beta$ is performed in accordance with the formula (2) on the basis of the DC source voltage $E_d$ read at step 51 and the frequency f obtained at step 54. Thereafter, at step 57, a table prepared in the ROM 32, in which data obtained in accordance with the characteristics of FIG. 5 are stored, is retrieved by the above obtained $\beta$ and f as address signals, whereby the pulse mode N is determined. Also the thus obtained N is once stored in a predetermined area of the RAM 34 at step 58.

At step 59, a table prepared in ROM 32, in which data obtained in accordance with the characteristics of FIG. 6 are stored, is retrieved by the above obtained N as an address signal, whereby the constant $k_5(N)$ is obtained. Then, at step 60, the calculation is carried out in accordance with the formula (b 4) on the basis of the thus obtained $k_5(N)$ and $\beta$ obtained at step 56, whereby the modulation factor $\gamma$ is determined. The obtained $\gamma$ is once stored in a predetermined area of the RAM 34 at step 61, too.

Finally, at step 62, f, N and $\gamma$ stored in the respective areas of the RAM 34 are read out and outputted to the PWM control unit 14 through the output port 44.

Also in this embodiment, reference frequencies, at which the pulse mode in the operation of a PWM-controlled inverter is switched over, can be adaptively changed, taking account of the alteration of a V/f ratio characteristic of an induction motor fed by the inverter as well as the variation in the DC source voltage.

We claim:

1. A control apparatus for an inverter, which is fed with a DC voltage and supplies an induction motor with a variable voltage/variable frequency output AC voltage produced in accordance with a PWM control, comprising:

detection means for detecting a frequency (an output frequency) of the output AC voltage of the inverter;

output AC voltage factor calculating means for calculating an output AC voltage factor, which is a ratio of an output AC voltage to be produced by the inverter at that time to a maximum value of the output AC voltage, which can be produced by the inverter under a then present DC voltage, on the basis of the output frequency from said detection means and the DC voltage;

pulse mode determining means for determining a pulse mode in the operation of the inverter, in which a particular number of voltage pulses is maintained within one cycle of the output AC voltage, on the basis of the output frequency from said detection means and the output AC voltage factor from said output AC voltage factor calculating means modulation factor calculating means for producing the modulation factor on the basis of the output AC voltage factor from said output AC voltage factor calculating means and the pulse mode signal from said pulse mode determining means; and PWM control means for producing gate signals for the inverter on the basis of the modulation factor and the output frequency in accordance with the pulse mode determined in said pulse mode determining means.

2. A control apparatus for an inverter as defined in claim 1, wherein said pulse mode determining means limits an operation region of the inverter in every pulse mode so that a product of a number of voltage pulses in the respective pulse mode and the output frequency is substantially equal to a value determined by the limitation of a switching frequency of the inverter.

3. A control apparatus for an inverter, which is fed by a DC voltage source and operated on the PWM control base to produce an output AC voltage so as to maintain a ratio of its voltage value to its frequency (an output frequency) constant at a desired value, the output AC voltage being applied to an induction motor, comprising:

various detector means for detecting a rotational speed n of the induction motor, an actual motor current $I_M$ and a DC source voltage $E_d$;

microcomputer means for executing a predetermined processing on the basis of the rotational speed n, the actual motor current $I_M$, a motor current reference $I_R$ and the DC source voltage $E_d$ detected by said detector means to determine the output frequency f, a pulse mode signal N and a modulation factor $\gamma$; and PWM control means for receiving the output frequency f, the pulse mode signal N and the modulation factor $\gamma$ to produce gate signals for the inverter, wherein said microcomputer means is programed to execute the following steps;

step for obtaining the output frequency f on the basis of the rotational speed n, the actual motor current $I_M$ and the motor current reference $I_R$;

step for calculating an output AC voltage factor $\beta$, which is a ratio of an output AC voltage to be produced by the inverter at that time to a maximum value of the output AC voltage, which can be produced by the inverter under a then present DC voltage $E_d$, on the basis of the output frequency f and the DC source voltage $E_d$;

step for determining the pulse mode N by retrieving a table provided in said microcomputer means, in which data concerning the pulse mode N are stored, on the basis of the output frequency f and the output AC voltage factor $\beta$;

step for calculating the modulation factor $\gamma$ on the basis of the output AC voltage factor $\beta$ and a constant depending on the pulse mode N, which is obtained by retrieving a table provided in said microcomputer means, in which data of the constant are stored with respect to the pulse mode N; and step for outputting the thus obtained output frequency f, the pulse mode signal N and the modulation factor $\gamma$ to said PWM control means.

* * * * *